United States Patent [19]

Anderson

[11] Patent Number: 5,343,320
[45] Date of Patent: Aug. 30, 1994

[54] PUMP LASER CONTROL CIRCUIT FOR AN OPTICAL TRANSMISSION SYSTEM

[75] Inventor: Cleo D. Anderson, Colts Neck, N.J.

[73] Assignee: AT&T Bell Laboratories, Murray Hill, N.J.

[21] Appl. No.: 926,629

[22] Filed: Aug. 3, 1992

[51] Int. Cl.$^5$ .......................... G02B 6/26; H01S 3/00
[52] U.S. Cl. ..................... 359/160; 359/176; 359/179; 359/341; 372/30; 372/70
[58] Field of Search ............... 359/134, 160, 173, 174, 359/176, 177, 341, 345, 179, 159; 372/6, 70, 72, 29, 30; 385/142

[56] References Cited

U.S. PATENT DOCUMENTS

| | | | |
|---|---|---|---|
| 4,439,861 | 3/1984 | Bradford | 372/70 |
| 5,005,175 | 4/1991 | Desurvire et al. | 359/341 |
| 5,027,079 | 6/1991 | Desurvire et al. | 359/341 |
| 5,039,199 | 8/1991 | Mollenauer et al. | 359/341 |
| 5,058,974 | 10/1991 | Mollenauer | 359/341 |
| 5,115,338 | 5/1992 | DiGiovanni et al. | 359/341 |
| 5,173,957 | 12/1992 | Bergano et al. | 372/30 |
| 5,226,051 | 7/1993 | Chan et al. | 372/30 |

*Primary Examiner*—Alpus H. Hsu
*Attorney, Agent, or Firm*—Eugene S. Indyk

[57] ABSTRACT

An optical transmission system, especially useful in undersea applications, includes an optical path between two terminals with one or more repeaters located between the terminals for amplifying optical communications signals flowing in the optical path. The repeaters contain optical fiber amplifiers driven by pump lasers. The average optical power produced by the pump lasers is controlled in proportion to the magnitude of electrical line current produced by a controllable constant current source located in one of the terminals. This is achieved by regulator circuits which are responsive to a signal related to the magnitude of the line current and signals related to the actual optical output of the pump lasers. The magnitude of the line current may be conveniently set at the terminals so that the lowest bit error rate is achieved in the transmission system. Alternatively, the magnitude of the line current may also be set to at some minimum level to achieve an acceptable bit error rate and low pump laser and fiber amplifier aging.

4 Claims, 4 Drawing Sheets

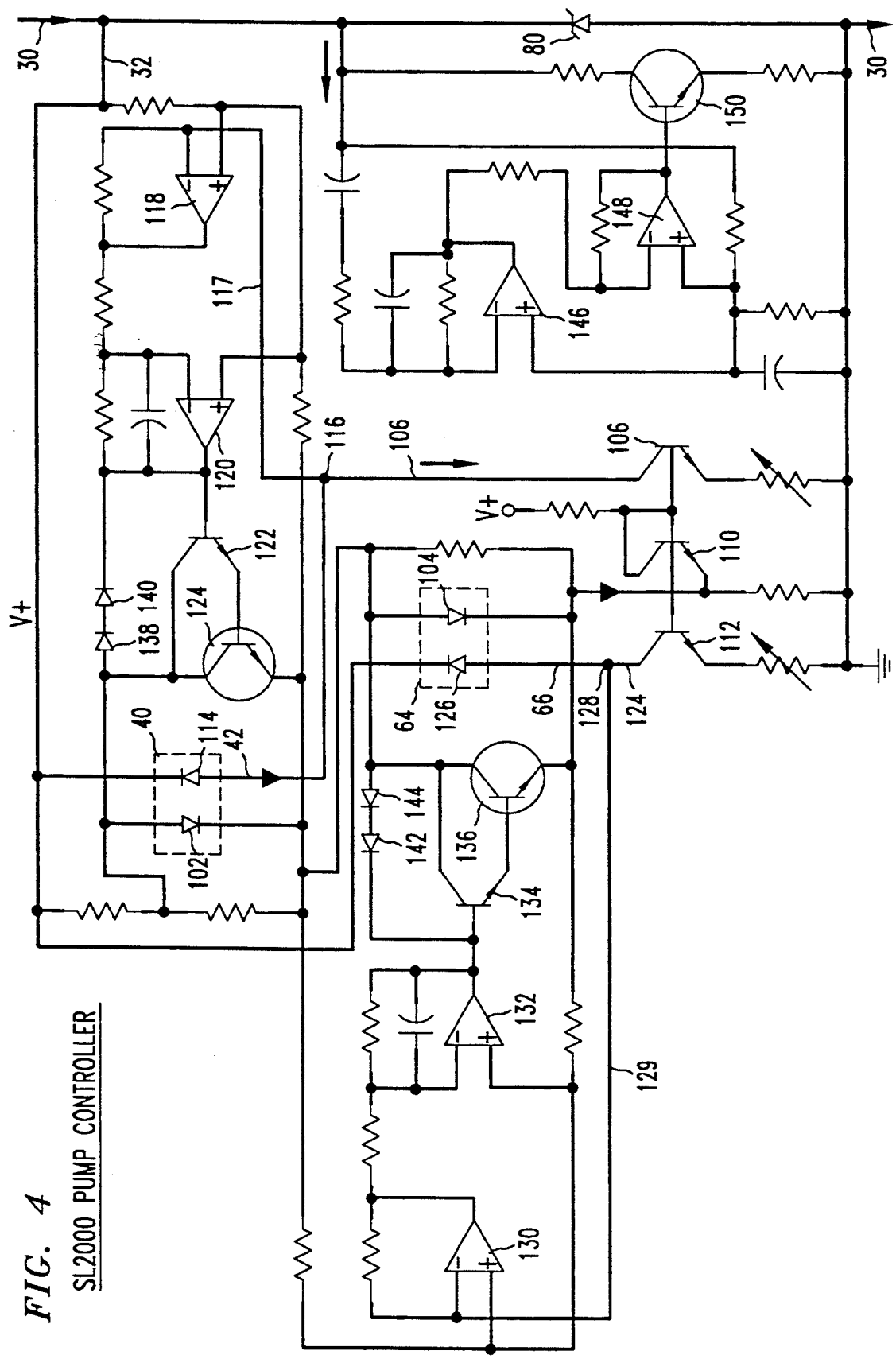
FIG. 4 SL2000 PUMP CONTROLLER

PUMP LASER CONTROL CIRCUIT FOR AN OPTICAL TRANSMISSION SYSTEM

TECHNICAL FIELD

This application relates to optical transmission systems. More particularly, this application relates to repeatered optical transmission systems involving optical fiber amplification of communication signals.

BACKGROUND

Long distance optical transmission systems generally require that the optical signals flowing in those transmission systems be amplified at periodic intervals along the length of the transmission system. The optical signals may be amplified by a number of repeaters located along the length of the transmission system. Repeatered optical transmission systems generally fall into two broad categories, those using electro-optical regenerators and those using optical fiber amplification. Electro-optical regenerators are not very desirable because they contain a complex array of parts, including a receiver which converts weak optical pulses into electrical pulses which are then amplified, reshaped, retimed, and converted back into light pulses for continued transmission through the system. These complexities can be avoided because recent advances in fiber and optical amplifier technology make possible the linear amplification of light pulses without such electro-optical conversion. Because of their relative simplicity and excellent gain characteristics, optical fiber amplifiers are highly desirable, especially in repeatered undersea systems.

It is crucial that the gain of the fiber amplifiers be carefully controlled for low bit error rates in the transmission system and long service life of the components used in the repeaters. The gain in a fiber amplifier results from interactions, in a specially doped length of fiber, between signal photons having a wavelength $\lambda_s$ with photons produced by a pump laser having a wavelength $\lambda_p$, where $\lambda_s$ is greater than $\lambda_p$. The dopant in the fiber, typically erbium, absorbs the power from the pump laser at wavelength $\lambda_p$ and emits optical power under such stimulation at a wavelength $\lambda_s$. One of the parameters which determines the gain of a fiber amplifier and the output power is the output power of the pump laser which stimulates the doped fiber. Specifically, both the gain and output power increase with increasing pump laser power. The gain and output power should be high enough so that the signal level is significantly above the noise floor. However, the output power cannot be too high or the effect of fiber non-linearities being to intrude.

The performance of a fiber amplifier based transmission system is limited by the presence of amplified spontaneous emission (ASE) noise generated by the amplifier and by the effect of chromatic dispersion and non-linearities in the transmission fibers. At low signal levels, inadequate signal-to-noise ratio is a concern. At high signal levels, non-linearities are a similar concern. The dominant nonlinear effect is the Kerr effect which causes the refractive index of the fiber to change with light power density through the fiber. This nonlinearity spreads the signal spectrum and mixes it with the ASE noise spectrum. The chromatic dispersion phenomenon then causes communication pulses to spread in time resulting in intersymbol interference. Under both low signal conditions and high signal conditions, therefore, serious signal degradation may result. In any transmission system containing fiber amplifiers, there is a particular level of pump laser power which produces minimum signal degradation and, hence, the lowest bit error rate by insuring optimum signal-to-noise ratio and minimizing the effects of nonlinearities. At lower pump laser power levels, the communications signal level decreases and the level of the ASE noise may make it difficult to differentiate the signals from the noise. At higher power levels, the nonlinear mixing of communication signals and ASE noise becomes important. Therefore, there is an urgent need for economically and effectively controlling the optical output power of each of the pump lasers in an optical fiber amplifier based transmission system.

SUMMARY

It is extremely difficult to predict in advance the optimum pump laser power needed in each repeater. It has been found, however, that it is not necessary to individually control each pump laser independently. Because there are only small variations among fiber amplifiers, it suffices to control the average power of all the pump lasers in the transmission system. The average pump laser power may be conveniently controlled from the terminals of the transmission system so that the system has the lowest bit error rate or so that the pump laser power is at a minimum level which will result in a certain minimum bit error rate. The latter approach results in a lower pump aging rate, a longer system life, and lower maintenance costs.

In one example of this invention, the requirements of economically and efficiently controlling the optical output power of the pump lasers in optical fiber amplifier based repeaters are met by an apparatus which regulates the optical power produced by the pump lasers in accordance with a controlled constant dc line current produced at the terminals of the optical transmission system. Each repeater contains an electronic regulator responsive to the magnitude of the line current and the optical power produced by a pump laser to control the output power produced by the laser. The pump laser stimulates a specially doped section of fiber carrying communication signals in the transmission system.

BRIEF DESCRIPTION OF THE DRAWINGS

FIG. 4 is a detailed circuit diagram of a control circuit for the pump lasers shown generally in FIG. 2.

DETAILED DESCRIPTION

Figure 1:
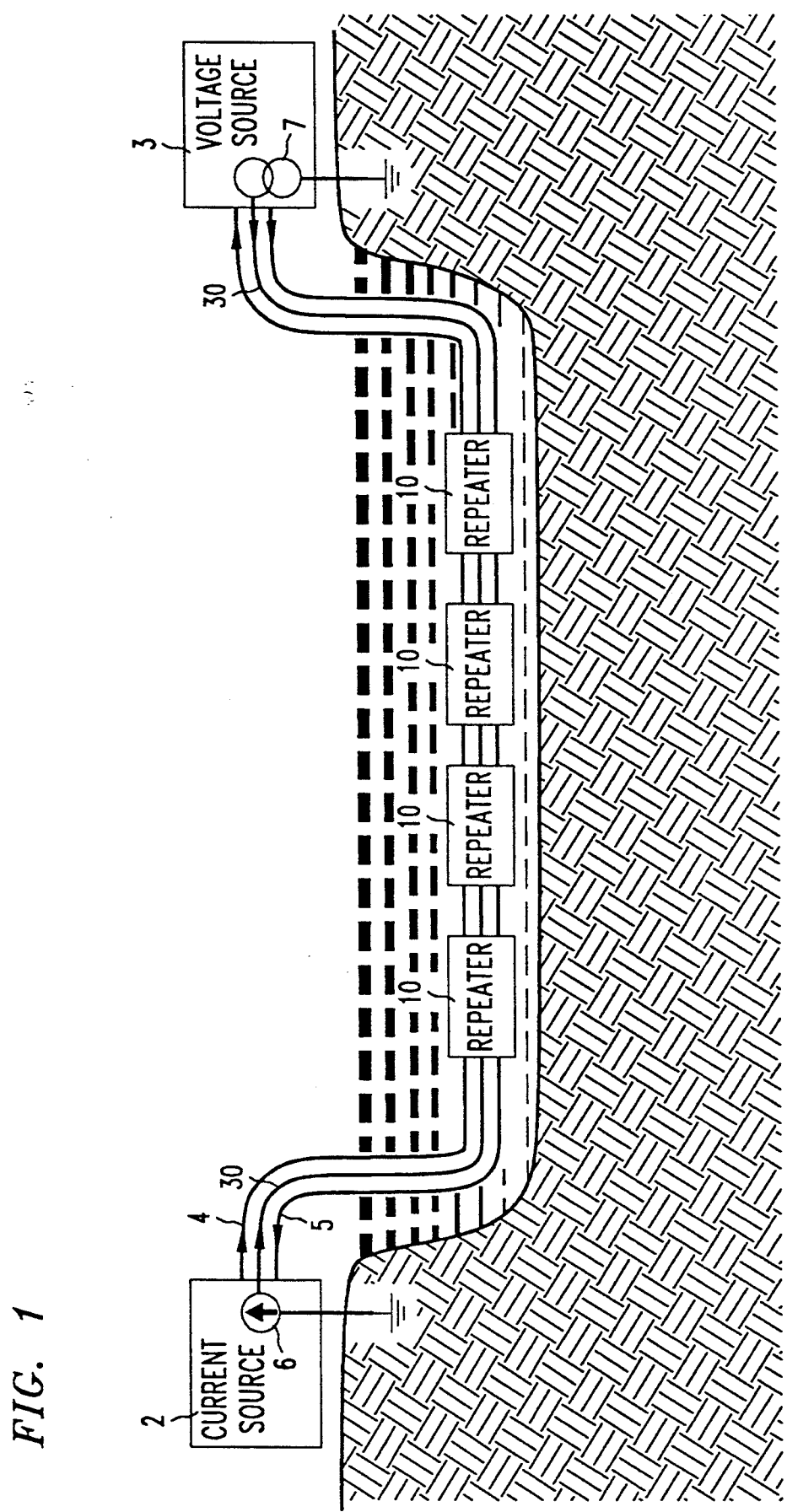
FIG. 1 shows an example of an optical transmission system in accordance with this invention.

FIG. 1 shows an underwater optical transmission system in accordance with this invention. The transmission system of FIG. 1 transmits optical communication signals back and forth between a first shore terminal 2 and a second shore terminal 3. Those communication signals are sent from the first terminal 2 to the second terminal 3 by way of an optical path 4 and are sent from the second terminal 3 to the first terminal 2 by way of an optical path 5. A plurality of repeaters, each of which has been designated with a reference number 10 in FIG. 1, are located in series at predetermined intervals along the optical paths 4 and 5. The repeaters 10 serve to amplify the optical signals as they travel between terminals 2 and 3. The repeaters 10 contain optical fiber amplifiers and pump lasers to accomplish their amplification functions. A constant current source 6 in terminal 2 produces a constant electrical current of predetermined magnitude which is used to power the pump lasers in the repeaters 10. The magnitude of the constant current may be set or adjusted by a suitable control mechanism in the constant current source 6 so that the average optical power produced by the pump lasers in the repeaters 10 has a desired average magnitude. This desired average magnitude should be set such that a predetermined bit error rate is produced by the transmission system. For example, the average pump laser power may be set so that the transmission system has its minimum bit error rate or the average pump laser power may be set so that the bit error rate of the transmission system is at some minimum acceptable level and the components of the repeater are not driven excessively. The magnitude of the constant current may be set to compensate for component aging in the repeaters 10. The constant current is directed to the pump lasers by way of a center conductor 30 which serves to connect the pump lasers of all of the repeaters in series with the constant current source 6. The center conductor 30 is connected to a voltage source 7 located in the terminal 3. Both the current source 6 and the voltage source 7 are connected to sea ground in the transmission system of FIG. 1.

Figure 2:
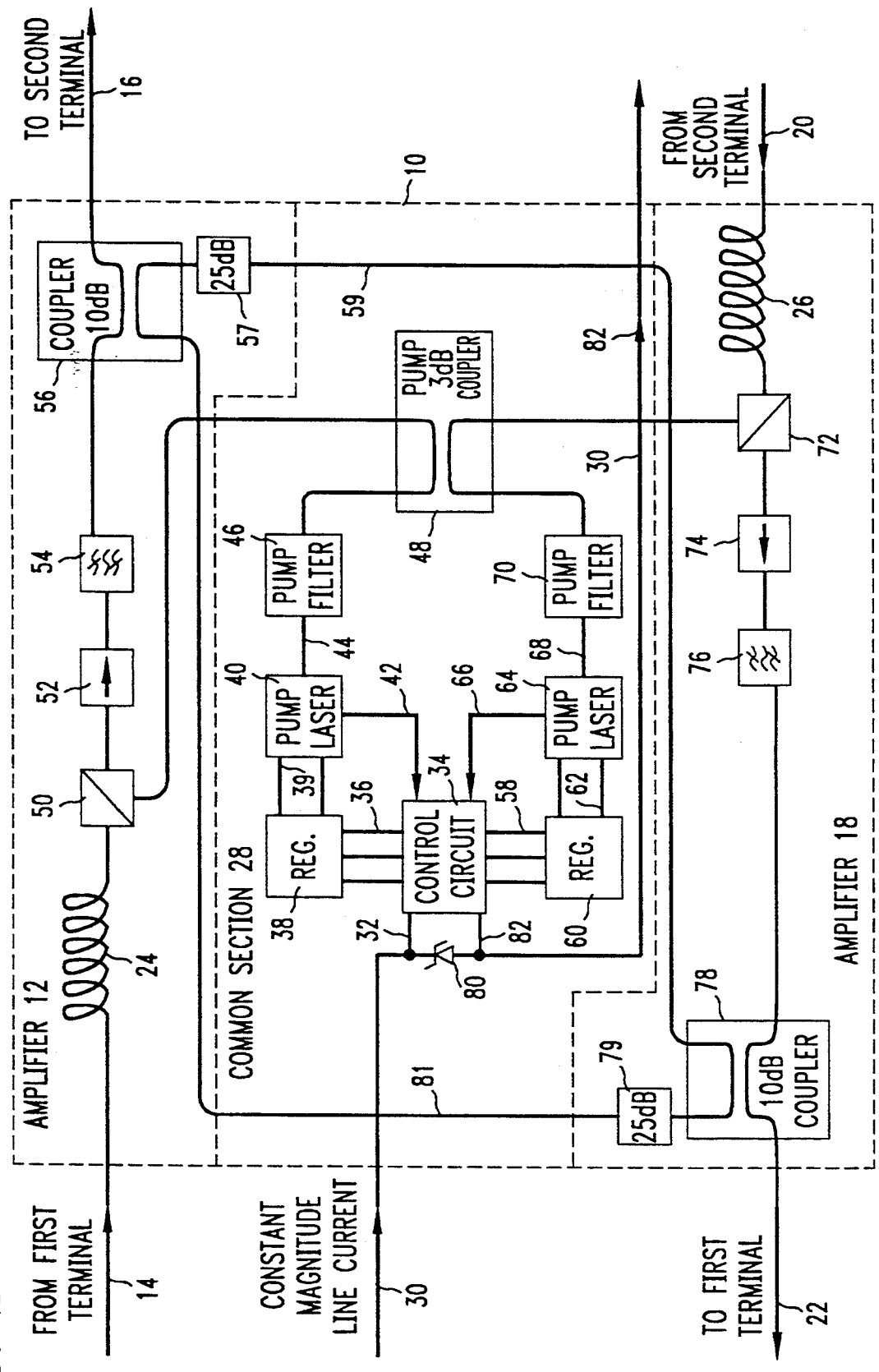
FIG. 2 is a schematic diagram of one example of an optical fiber amplifier based repeater useful in an optical transmission system in accordance with this invention.

FIG. 2 is a block diagram of an example of a repeater 10 in accordance with this invention. The repeater 10 may be one of a number of repeaters in an optical transmission system used to amplify optical communications signals flowing along optical paths between two terminals of the transmission system. The optical transmission system may be an undersea transmission system in which the terminals are located on shore and one or more repeaters may be located underwater. The repeater 10 shown in FIG. 2 comprises an optical fiber amplifier 12 which amplifies optical communication signals received on an input fiber 14 either directly from a first terminal of the transmission system or indirectly from one or more other repeaters located in the optical path between the first terminal and the repeater 10. The amplified optical communication signals are directed on an output fiber 16 either directly to a second terminal of the optical transmission system or indirectly to the second terminal via one or more additional repeaters in the optical path between the repeater 10 and the second terminal. The repeater 10 in FIG. 2 also comprises another optical fiber amplifier 18 which amplifies optical communication signals received on an input fiber 20 either directly from the second terminal of the transmission system or indirectly from one or more other repeaters located in the optical path between the second terminal and the repeater 10. The amplified optical communication signals are directed on an output fiber 22 either directly to the first terminal of the optical transmission system or indirectly to the first terminal via one or more additional repeaters in the optical path between the first terminal and the repeater 10.

The optical fiber amplifier 12 contains a section of specially doped fiber 24 in series with input fiber 14. The section of fiber 24 can be stimulated by exposing it to optical energy of a predetermined wavelength $\lambda_s$ to amplify the communications signals on input fiber 14. The optical fiber amplifier 18 contains a similarly doped section of fiber 26 in series with input fiber 20 which amplifies communication signals on fiber 20 in response to stimulation by optical energy of the predetermined wavelength $\lambda_s$. Typically, the sections of fiber 24 and 26 are doped with a suitable substance such as erbium which provides the amplification capabilities.

The repeater 10 contains a common section 28 which controls the amount of optical stimulation applied to the doped fibers 24 and 26. A controlled current source producing dc electrical current having a predetermined constant magnitude is located in one of the terminals and provides electrical drive power to the fiber amplifiers in the transmission system. The current source delivers the constant current to the repeater 10 in FIG. 2, and to every other repeater in the communications system, via a common center conductor 30. The center conductor 30 serves to connect the common sections of all of the repeaters in the transmission system in series with the current source. The line current is directed to an input line 32 of a control circuit 34 which produces an output signal on line 36. The output signal of the control circuit 34 controls a regulator 38 which is connected via line 39 to drive a pump laser 40. The regulator 38 is responsive to the output signal from the control circuit 34 to regulate the optical output power of the laser 40 so that it is substantially proportional to the magnitude of the line current directed to the input of the control circuit 34 on line 30. A feedback signal relating to the actual optical power being produced by the pump laser 40 is directed on line 42 to another input of the control circuit 34 which then commands the regulator 38 to change the electrical drive power to the pump laser 40 when the optical output power of the laser 40 deviates from a desired level substantially proportional to the magnitude of the line current. The optical output power of the pump laser 40 is directed on a line 44 to an input of a pump filter 46. The output of the pump filter 46 is directed to a pump coupler 48, the output of which is sent to a directional wavelength division multiplexer 50. The multiplexer 50 causes the optical energy produced by the pump laser 40 to be directed into the doped fiber 24 to amplify optical communications signals in that doped fiber 24. Amplified communication signals at a carrier frequency $\lambda_s$ from the doped fiber 24 are directed by the wavelength division multiplexer 50 through an isolator 52, an ASE noise filter 54, and a coupler 56 to the output fiber 16.

The common section 28 also controls the level of optical stimulation applied to the doped fiber 26. The control circuit 34 produces an output signal on line 58 which causes a regulator 60 to control electrical drive power on line 62 to be controlled so that a pump laser 64 produces optical output power having a desired magnitude substantially proportional to the magnitude of the line current introduced to the common section on line 30. A feedback signal is produced on line 66 relating to the magnitude of optical power actually being produced by the pump laser 64. The control circuit 34 is responsive to the magnitude of the line current on line 32 and the feedback signal on line 66 to cause the regulator 60 to change the drive power to the pump laser 64 when the optical output power of the laser 64 deviates from a desired magnitude proportional to the magnitude of the line current. The optical output power of the pump laser 64 on line 68 is delivered to a pump filter 70 and thence to the pump coupler 48 and a wavelength division multiplexer 72. The multiplexer 72 causes optical energy at the frequency of the pump laser to be directed to the doped fiber 26 to stimulate that fiber and amplify communication signals introduced to the fiber 26 via input fiber 20. The amplified communications signals at the carrier frequency $\lambda_s$ from the fiber 26 are routed by the wavelength division multiplexer 72 through an isolator 74, an ASE noise filter 76, and a coupler 78 to the output fiber 22.

A Zener diode 80 provides overvoltage protection for the control circuit 34 and is connected between lines 32 and 82 in FIG. 2. After line current has passed through the control circuit 34, it is directed on a line 82 out of the control circuit and on toward the common section of the next repeater in the transmission system as illustrated by arrow 82 drawn on conductor 30 in FIG. 2.

A portion of the signal flowing in fiber 16 traveling in a direction from the first terminal to the second terminal may be fed back to the first terminal by means of the coupler 56, an attenuator 57, an optical path 59, the coupler 78, and the fiber 22 for test purposes in accordance with the principles of application Ser. No. 07/753,582, filed Sep. 3, 1991. Similarly, a portion of the signal flowing in fiber 22 traveling in a direction from the second terminal to the first terminal may be fed back to the second terminal by means of the coupler 78, an attenuator 79, an optical path 81, and the coupler 56 in accordance with the principles of this application. The optical outputs of the pump lasers 40 and 64 are directed to the fibers 24 and 26 by means of the coupler 48 so that either one of the pump lasers may be used to power both fibers 24 and 26 in a situation where one of the pump lasers has failed in accordance with the principles of application Ser. No. 07/758,665, filed Sep. 12, 1991.

Figure 3:
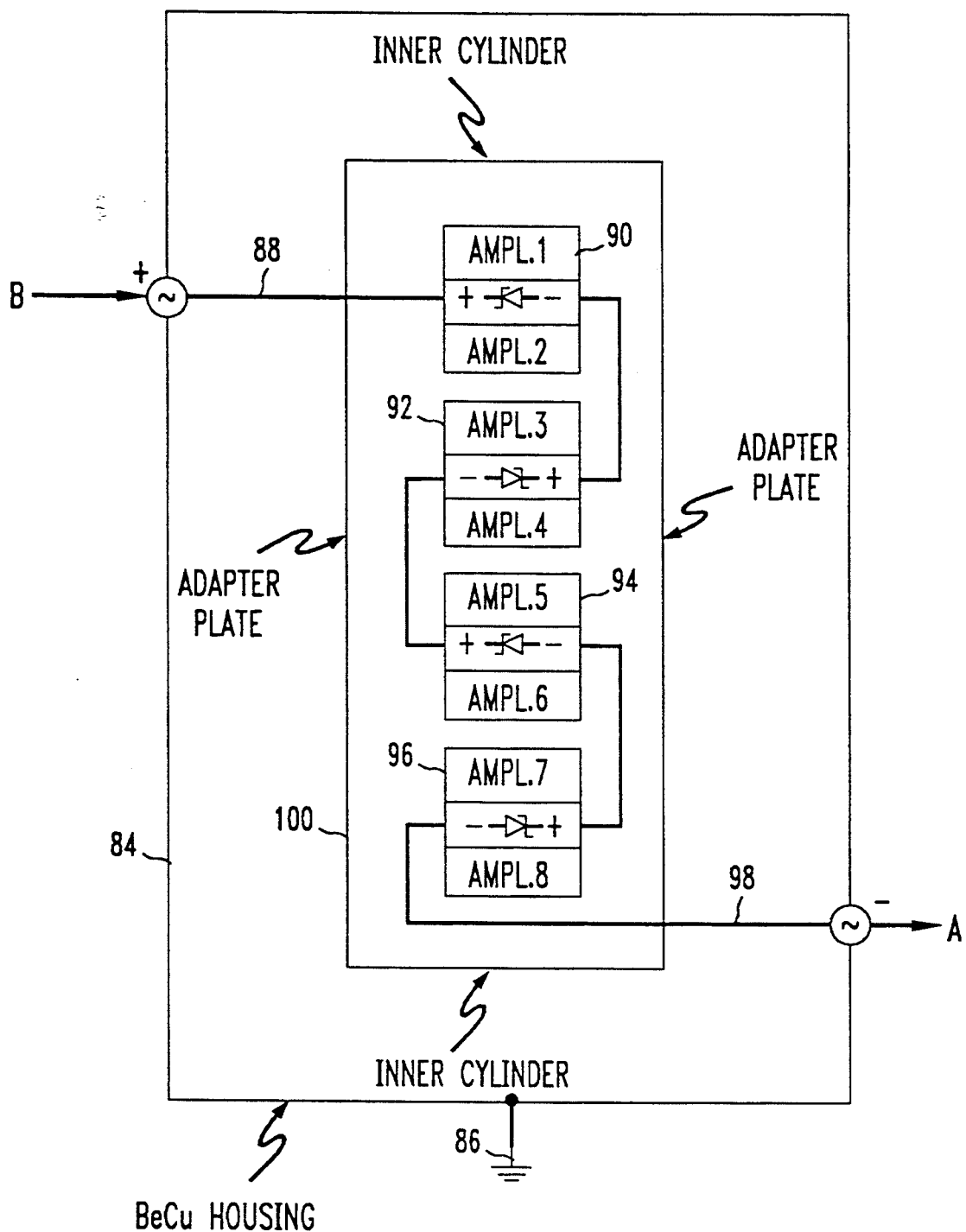
FIG. 3 shows another example of an optical fiber amplifier based repeater useful in an optical transmission system in accordance with this invention.

Although FIG. 2 shows only one pair of fiber amplifiers for both directions of transmission through the repeater 10, it is possible in some embodiments of the invention to have more than one series connected pair of amplifiers within a single repeater. FIG. 3 shows an example of such multiple stages of amplification in a single repeater. FIG. 3 shows a repeater housing 84, which may be constructed of beryllium copper, connected to sea ground 86 in an underwater transmission system. The amplifier pairs 90, 92, 94, and 96 are located in a cylindrical housing within the repeater housing 84. Line current is introduced into the repeater of FIG. 3 on a center conductor 88. Amplifier pairs 90, 92, 94, and 96 are connected in series with each other and receive the line current on line 88. Line current passes through each of the amplifier pairs 90, 92, 94, and 96 and is directed out of the repeater on a line 98. Each of the amplifier pairs 90, 92, 94, and 96 contains a fiber amplifier stage like the fiber amplifier 12 in FIG. 2 for one direction of transmission and a fiber amplifier stage like the fiber amplifier 18 in FIG. 2 for a second direction of transmission. Each of the amplifiers in the amplifier pairs 90, 92, 94, and 96 may be controlled in a fashion like the amplifiers 12 and 18 are controlled, namely, the amplifiers may be controlled so that the optical output power produced by pump lasers is substantially proportional to the magnitude of the line current on line 88. In the example of FIG. 3, the power circuits are connected via a single resistor to the chassis and there are power connections between the amplifiers. The resistor prevents the buildup of static charge between the power circuits and the inner cylinder.

FIG. 4 shows in more detail an example of electronic circuitry which may be used to implement the function of the common section 28 of the repeater 10 shown in FIG. 2. The circuitry of FIG. 4 may also be used to implement a corresponding common section for the repeater shown in FIG. 3. The electronic circuitry of FIG. 4 receives line current of a predetermined constant magnitude on a conductor 30 which is produced by a controllable constant current source is one of the terminals of the transmission system. The constant current on line 30 is delivered to each series connected repeater in the transmission system for purposes of powering the pump lasers and controlling the magnitude of the optical power produced by those lasers. Two pump lasers 40 and 64 in one of the repeaters are connected in series with the conductor 30 and receive a part or all of the line current to produce optical pump power injected into the fibers 24 and 26 for amplifying optical communications signals. The pump lasers 40 and 64 contain a laser diode 102 and a laser diode 104, respectively. The amount of the line current which flows through the pump lasers, and the amount of optical power they produce, is controlled by a feedback circuit which controls the drive current through the pump lasers as a function of a reference current signal proportional to the magnitude of the line current and a feedback signal proportional to the actual magnitude of the optical power produced by the pump lasers 40 and 64.

A reference current proportional to the line current in conductor 30 is produced in line 106 by the action of a current reference circuit comprising three transistors 108, 110, and 112 connected together in a current mirror configuration. The magnitude of the reference current represents the optical power desired from the pump laser 40. The laser 40 includes a means for focusing a fixed portion of the optical output from the backface of the laser diode 102 onto a monitor diode 114. The monitor diode 114 produces a feedback dc current signal proportional to the magnitude of the optical power produced by the pump laser 40. The reference current signal and the feedback current signal are connected together at a summing junction 116, thus creating an error signal on line 117 representing, the difference in magnitude of the desired and actual power outputs of the pump laser 40. This error signal is connected to a pair of series connected control amplifiers 118 and 120, the output which is connected to a shunt regulator comprising a pair of transistors 122 and 124 connected in a Darlington configuration. The error signal, after amplification by the amplifiers 118 and 120, drives the shunt regulator such that the current through the shunt regulator is proportional to the amount by which the current through the backface monitor diode exceeds the current produced by the aforementioned current reference circuit. The drive current to the pump laser 40 thus is regulated to be substantially equal to the magnitude of the reference current and substantially proportional to the line current directed to the repeaters on conductor 30. The pump power to laser 40 thus can easily be controlled from the terminals of the communication system.

Similarly, the current reference circuit produces a reference current on line 124 proportional to the line current is conductor 30. The magnitude of this reference current represents the optical power desired from the pump laser 64. The laser 64 includes a means for focusing a portion of the optical output from the backface of the laser diode 104 onto a monitor diode 126. The monitor diode 126 produces a feedback DC current signal proportional to the magnitude of the optical power produced by the pump laser 64. The reference current signal on line 124 and the feedback current signal from the monitor diode 126 are connected together at a summing junction 128, thus creating an error signal on line 129 representing the difference in magnitude of the desired and actual power outputs of the pump laser 64. This error signal is connected to a pair of series connected control amplifiers 130 and 132, the output of which is connected to a shunt regulator comprising a pair of transistor 134 and 136 connected in a Darlington configuration. The error signal, after amplification by the amplifiers 130 and 132, drives the shunt regulator such that the current through the shunt regulator is proportional to the amount by which the current through the backface monitor diode 126 exceeds the reference current produced by the current reference circuit. The drive current to the pump laser 64 thus is regulated to be equal to the magnitude of the reference current and substantially proportional to the line current directed to the repeater on conductor 30. As in the case of the pump laser 40, the power to the pump laser 64 can be easily controlled from the terminals of the communications system by appropriately setting the level of the current on conductor 30.

Likewise, the pump power in any of the other repeaters located between the terminals of the transmission system can be similarly controlled by an appropriate setting of the magnitude of the dc current on conductor 30. In systems having more than one repeater in series with the conductor 30, it will be the average pump power which will be determined by the set magnitude of the line current on conductor 30.

The circuit of FIG. 4 also includes protective diodes 138, 140, 142, and 144 which together with the Darlington connected shunt regulator limits the maximum pump laser voltages to about 3 volts and provides a current path in the case of an open circuit pump failure. The circuit of FIG. 4 also contains the aforementioned Zener diode 80 which is normally nonconducting and which protects the controller and pumps from excess currents, for example, from current surges resulting from cable faults. The circuit of FIG. 4 also includes a low frequency bypass circuit composed of amplifier 146, amplifier 148, and transistor 150, alo with certain passive components which determine the gain and frequency response of the low frequency bypass circuit. Examples of suitable circuit values for the passive components are given in FIG. 4. The purpose of this circuit is to provide a low impedance path for AC currents having frequencies in a predetermined range, for example, in the range of 4–30 Hz. AC currents like these may be superimposed on the DC line current in conductor 30 to facilitate the location of an undersea cable from the surface of the water during maintenance and repair operations. The circuit is basically an active shunt filter which shunts the AC component of the current on conductor 30 around the pump power control circuitry. As described above, the remainder of the current on conductor 30 flows through the two pump lasers 40 and 64, their controllers, and the reference circuit.

To optimize a transmission system using one or more repeaters in accordance with this invention, the bit error rate or the signal-to-noise ratio of the system can be measured as a function of line current on conductor 30. The magnitude of the line current may then be set so that the bit error rate or signal-to-noise ratio is maximized or otherwise set to some desired level, for example, to some minimum acceptable level to perhaps extend the life of the components used in the repeaters.

I claim:

1. An optical transmission system, comprising:
   a controllable line current source for producing a substantially constant current of a predetermined magnitude;
   an optical fiber amplifier which amplifies optical communications signals carried by the transmission system;
   a circuit responsive to the magnitude of the line current comprising a pump laser for controlling the gain of the fiber amplifier in substantial proportion to the predetermined magnitude of the constant current in which the pump laser produces an optical power output which is directed to a section of doped fiber in the optical fiber amplifier;
   the circuit controlling the gain of the fiber amplifier further comprising:
   a current reference circuit which produces a current signal having a magnitude proportional to the magnitude of the constant current;
   a circuit for producing a current signal having a magnitude representing the magnitude of the optical power output produced by the pump laser; and
   a regulator for controlling the optical power output of the laser in accordance with any difference between the magnitude of the current signals produced by the current reference circuit and the circuit for producing a current signal representing the magnitude of the optical power output of the pump laser.

2. The transmission system of claim 1, in which the circuit for producing a current signal having a magnitude representing the magnitude of the optical power output of the pump laser comprises a monitor diode responsive to the optical power output of the pump laser.

3. The transmission system of claim 1, further comprising:
   a summing junction producing an output signal related to the difference between the magnitudes of the current reference signal and the current signal representing the magnitude of the optical power output of the pump laser;
   an amplifier for increasing the magnitude of the output signal from the summing junction;
   a shunt regulator responsive to the increased magnitude output signal from the summing junction which controls drive current to the pump laser.

4. An optical underwater transmission system, comprising:
   first and second shore terminals;
   a first optical path for carrying optical communications signals from the first shore terminal to the second shore terminal;
   a second optical path for carrying optical communications signals from the second shore terminal to the first shore terminal;
   a plurality of repeaters spaced at predetermined distances along the first and second optical paths in which each repeater includes a fiber amplifier for amplifying the optical communications signals in those paths;
   a constant current source in one of the first and second shore terminals for providing substantially constant electrical current of a predetermined magnitude for the repeaters;

a pump laser in each of the repeaters for producing optical power which causes the fiber amplifiers to amplify the optical communications signals;

a means for controlling the average optical power produced by the pump lasers in the plurality of repeaters in response to the magnitude of the constant current;

the means for controlling the average optical power comprising a regulator for causing some or all of the constant current to flow through the pump laser; and a circuit responsive to the magnitude of the constant current and the optical power output of the pump laser for controlling the regulator to cause an amount of the constant current to flow through the pump laser such that the optical power produced by the pump laser is a desired amount proportional to the magnitude of the line current.

* * * * *